(12) United States Patent
Tanaka et al.

(10) Patent No.: US 7,177,744 B2
(45) Date of Patent: Feb. 13, 2007

(54) ELASTIC SUPPORT ASSEMBLY FOR ELECTRIC POWER STEERING APPARATUS

(75) Inventors: Hajime Tanaka, Toyota (JP); Hisatake Yamada, Aichi (JP); Norihisa Nishikawa, Susono (JP); Hideo Kometani, Toyota (JP)

(73) Assignee: Koyo Seiko Co., Ltd, Osaka (JP)

( * ) Notice: Subject to any disclaimer, the term of this patent is extended or adjusted under 35 U.S.C. 154(b) by 112 days.

(21) Appl. No.: 10/776,347

(22) Filed: Feb. 12, 2004

(65) Prior Publication Data

US 2004/0210365 A1  Oct. 21, 2004

(30) Foreign Application Priority Data

Feb. 14, 2003 (JP) ............... 2003-037086

(51) Int. Cl.
  *B62D 6/00* (2006.01)
  *B62D 5/04* (2006.01)
(52) U.S. Cl. ............ 701/41; 701/42; 180/6.2; 180/444; 475/18; 477/1
(58) Field of Classification Search ............ 701/41–42; 180/443, 444, 6.2; 74/7 D, 10.85, 425, 724; 477/1; 475/18; 172/278.9
See application file for complete search history.

(56) References Cited

U.S. PATENT DOCUMENTS 5,605,071 A  2/1997 Buchanan, Jr.
6,179,473 B1  1/2001 Ponson et al.
6,412,591 B1  7/2002 Endo et al.
6,550,567 B2 *  4/2003 Murakami et al. .......... 180/444
2002/0148315 A1  10/2002 Mittendorf et al.

FOREIGN PATENT DOCUMENTS

| DE | 195 13 970 A1 | 10/1996 |
| EP | 0 943 842 A1 | 9/1999 |
| FR | 2 806 135 | 9/2001 |
| GB | 2 356 910 A | 6/2001 |
| JP | 11-043062 | 2/1999 |
| JP | 11-43062 | 2/1999 |
| JP | 11-171027 | 6/1999 |

OTHER PUBLICATIONS

European Search Report dated Feb. 15, 2005.
European Search Report dated Dec. 23, 2004.

* cited by examiner

*Primary Examiner*—Y. Beaulieu
(74) *Attorney, Agent, or Firm*—McGinn IP Law Group, PLLC

(57) ABSTRACT

An elastic support assembly for an electric power steering apparatus in which a worm shaft is supported movably in a rotation axis direction through the elastic support assembly includes: a pair of first and second members relatively moving in the rotation axis direction according to a movement of the worm shaft; an elastic body provided between the first and second members in the rotation axis direction; and a cover which covers an outer periphery part of the elastic body from a radial direction of the worm shaft and is connected to the first member.

20 Claims, 11 Drawing Sheets

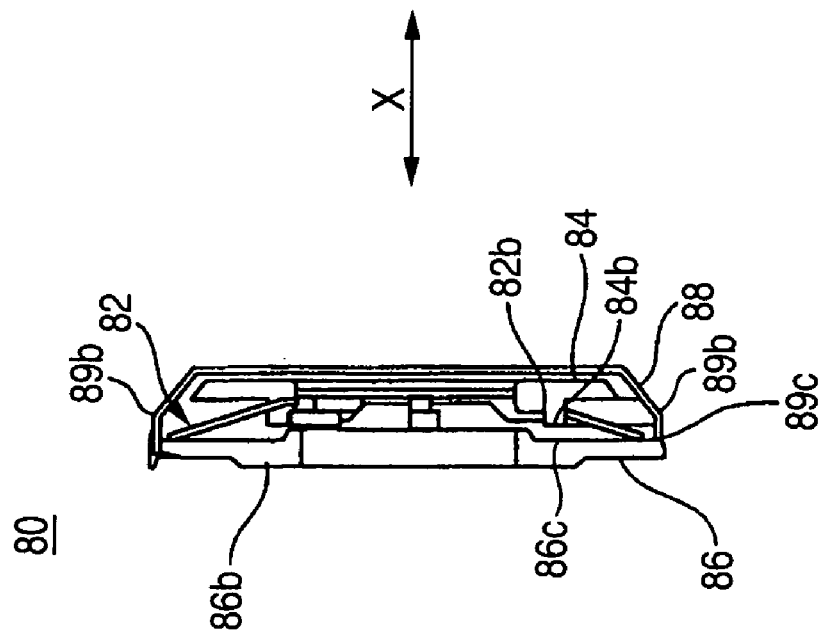
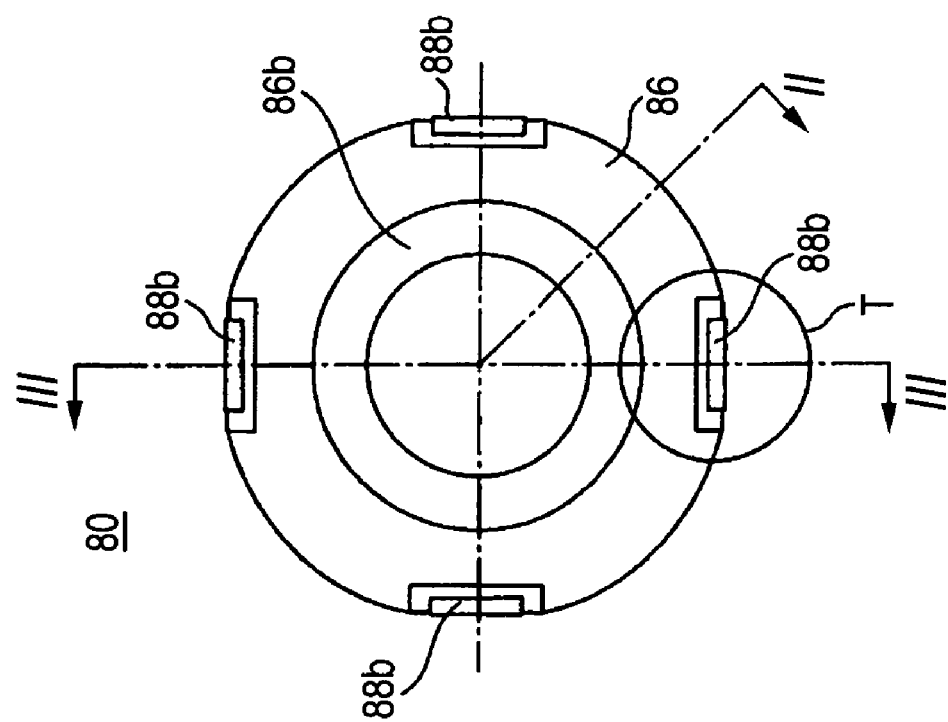

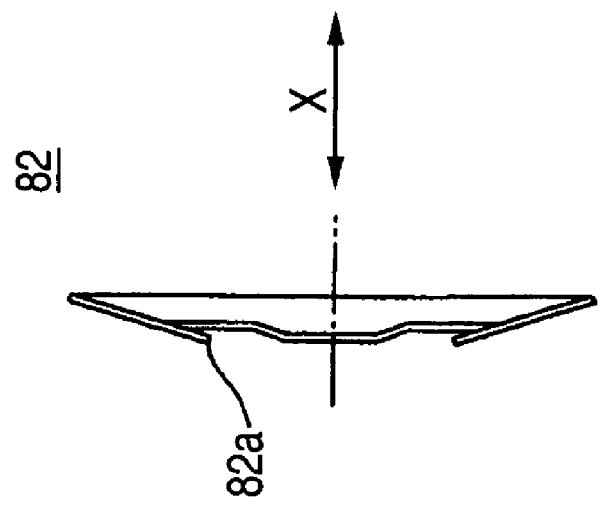
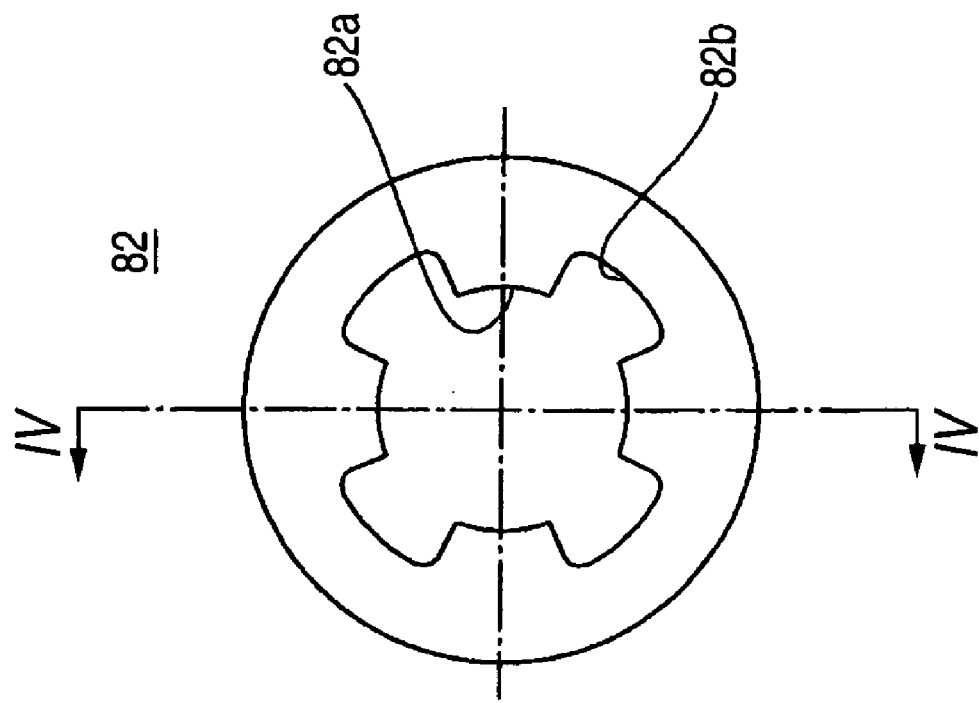

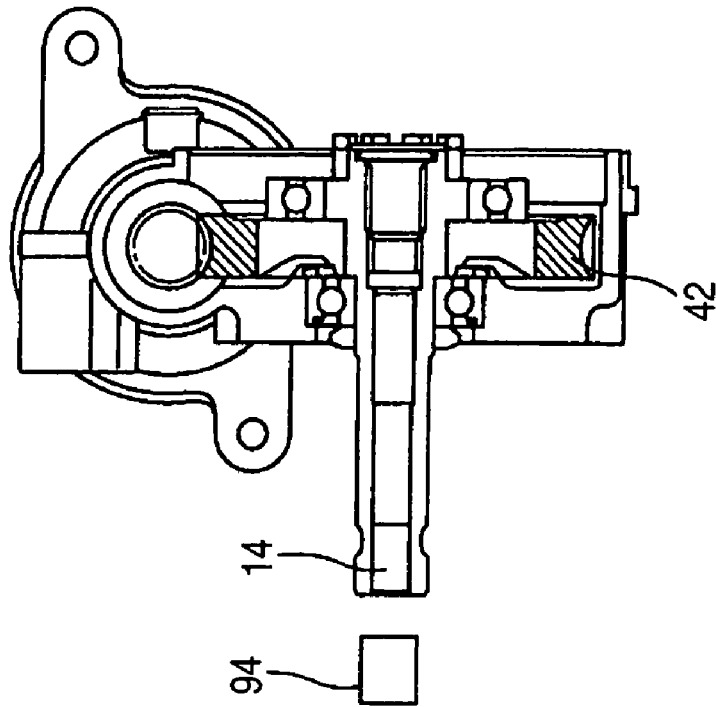
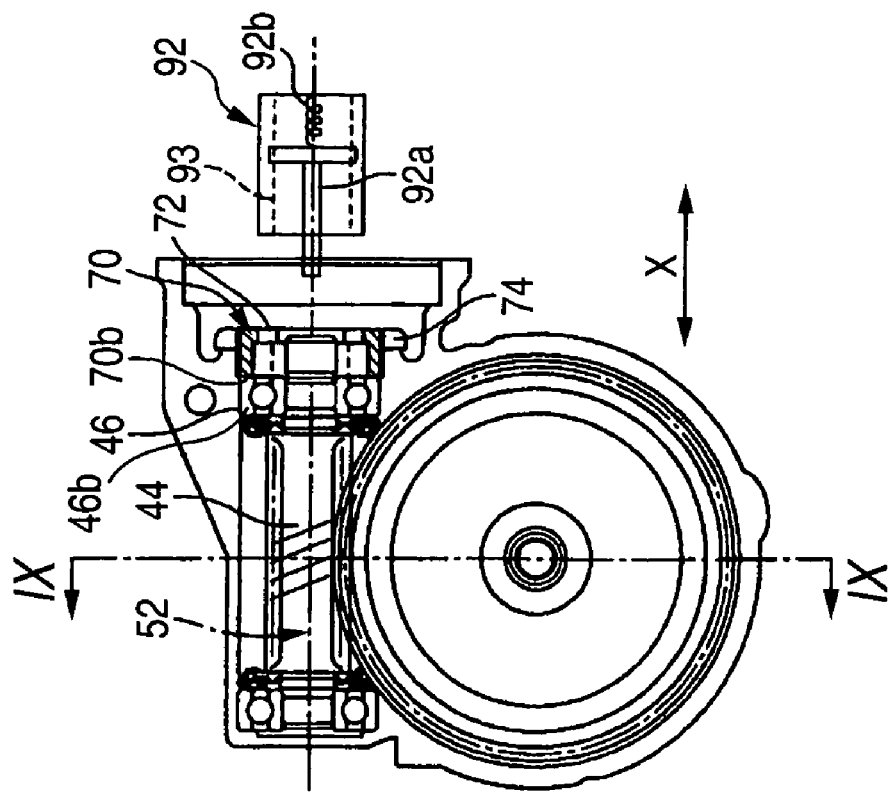

US 7,177,744 B2

ELASTIC SUPPORT ASSEMBLY FOR ELECTRIC POWER STEERING APPARATUS

BACKGROUND OF THE INVENTION

The present invention relates, in particular, to a reduction gear for an electric power steering apparatus in which a worm shaft is supported movably in a rotation axis direction through an elastic body, and a movable amount adjustment method for adjusting a movable amount of the worm shaft of the reduction gear for an electric power steering apparatus.

In the electric power steering apparatus in which a motor is driven in compliance with a steering angle of a steering wheel and a rotation output of the motor is transmitted to an output shaft of a steerage mechanism by being decelerated by a worm gear mechanism, there is known a structure elastically supporting the worm shaft formed with a worm in an axial direction in order to set a suitable backlash between tooth faces of the worm and a worm wheel which constitute a worm gear mechanism (for example, refer to Patent Document 1 and Patent Document 2). According to this structure, since the worm meshing with the worm wheel becomes movable in the axial direction, even in a case where an excess torque is exerted on the worm wheel, a collision between the tooth faces of the worm and the worm wheel is relieved by a movement of the worm in the axial direction, so that it becomes possible to reduce an abnormal noise by the collision of the tooth faces. Incidentally, in the above Patent Documents, as a member for elastically supporting the worm in the axial direction, there is disclosed an elastic body such as conical spring and O-ring each of which is provided between a flange part of the worm and a bearing.

Patent Document 1
 JP-A-11-43062

Patent Document 2
 JP-A-11-171027

By the way, in the structure in which the worm shaft is supported through the elastic body like the above related art, there is considered a case where a dispersion in movable amount of the worm occurs owing to a dimension error and an incorporation error of an individual such as the elastic body. In such a case, an intended moving amount of the worm shaft is not ensured, or the backlash of the bearing becomes liable to occur because a pressure application to the bearing is insufficient. As a result, there may occur a disadvantage that a feeling of a steering wheel operation is deteriorated, or the abnormal noise is generated. In a case where a load exceeding an intended load is applied to the elastic body owing to the dispersion in movable amount of the worm, a problem occurs from a viewpoint in durability of the elastic body.

Further, in the structure in which the worm shaft is supported through the elastic body like the above related art, since a sliding motion occurs between the elastic body and a spring seat with an expansion/contraction of the elastic body, wear particles generated from the sliding parts enter into meshing parts of the worm and the worm wheel, so that there arises also a problem that the durabilities of the worm and the worm wheel are deteriorated. Further, conversely, if foreign matters enter between the elastic body and the spring seat, there is a case where an expansion/contraction operation of the elastic body is hindered, so that there is a fear that an appropriate movable amount of the worm becomes unobtainable.

Accordingly, in the structure in which the worm shaft is supported through the elastic body, it becomes important to assure the appropriate movable amount of the worm in solving the above disadvantage and problems Additionally, it is desirable that the appropriate movable amount of the worm at this time is within such a range that no elastic body is deformed exceeding an allowable maximum deformation amount.

SUMMARY OF THE INVENTION

Whereupon, in the invention, it is an overall object to always assure the appropriate movable amount of the worm shaft (or worm) in the structure in which the worm shaft is supported through the elastic body.

In order to solve the aforesaid object, the invention is characterized by having the following arrangement.

(1) A method of adjusting a movable amount of a worm shaft in a reduction gear for an electric power steering apparatus in which the worm shaft is supported movably in a rotation axis direction through an elastic body, the method comprising:

a first step of moving the worm shaft to opposite sides in the rotation axis direction respectively until maximum limit prior to the worm shaft formed with a worm meshing with a worm wheel being incorporated to an output shaft of a motor;

a second step of measuring a displacement of the worm shaft during the first step;

a third step of calculating a movable amount of the worm shaft based on a measured result of the second step; and a fourth step of adjusting the movable amount of the warm shaft based on a calculated result of the third step (2) The method according to (1), wherein the movement of the worm shaft during the first step is realized by applying a rotation torque to the worm wheel under a state that a rotation of the worm shaft is restrained.

(3) The method according to (2), wherein a hysteresis of the displacement of the worm shaft and a hysteresis of the rotation torque of the worm wheel are measured in the second step, and a relation of the displacement of the worm shaft with respect to the rotation torque exerted on the worm wheel is evaluated in the third step.

(4) A movable amount adjustment apparatus for adjusting a movable amount of a worm shaft in a reduction gear for an electric power steering apparatus in which the worm shaft is supported movably in a rotation axis direction through an elastic body, the apparatus comprising:

a moving unit for moving the worm shaft to opposite sides in the rotation axis direction respectively until maximum limit prior to the worm shaft formed with a worm meshing with a worm wheel being incorporated to an output shaft of a motor;

a movable amount detection unit for detecting a movable amount of the worm shaft based on a displacement of the worm shaft when the worm shaft is moved to the opposite sides in the rotation axis direction respectively until the maximum limit; and a movable amount adjustment unit for adjusting the movable amount of the worm shaft based on a detected result of the movable amount of the worm shaft (5) The apparatus according to (4), wherein the moving unit applies a rotation torque to the worm wheel under a state in which a rotation of the worm shaft is restrained.

(6) The apparatus according to (4), wherein the moving unit applies a load in the rotation axis direction to the worm shaft.

(7) An elastic support assembly for an electric power steering apparatus in which a worm shaft is supported movably in a rotation axis direction through the elastic support assembly, the elastic support assembly comprising:

a pair of first and second members relatively moving in the rotation axis direction according to a movement of the worm shaft;

an elastic body provided between the first and second members in the rotation axis direction; and a cover which covers an outer periphery part of the elastic body from a radial direction of the worm shaft and is connected to the first member.

(8) The elastic support assembly according to (7), wherein
the first and second members include seating faces on which the elastic body seats, respectively, and the seating face of at least one of the first and second members is formed with a protrusion part protruding toward the seating face of the other of the first and second members.

(9) The elastic support assembly according to (7), wherein
the first and second members have substantially disc shape and respectively include insertion holes through which the worm shaft is inserted, the elastic body includes an insertion hole through which the worm shaft is inserted, the second member and the elastic body are interposed between the first member and the cover, the cover includes an upper face having an insertion hole through which the worm shaft is inserted, and a cylindrical periphery wall extending from an outer periphery part of the upper face to an outer periphery part of the first member, and the periphery wall is connected to the first member, and the elastic body and the second member are accommodated in a space defined by the first member, the upper face of the cover and the periphery wall of the cover so as to prevent the elastic body and the second member from separating therefrom.

(10) The elastic support assembly according to (9), wherein
the first and second members include respectively seating faces on which the elastic body seats and, the seating face of at least one member of the first and second members is formed with a protrusion part protruding toward the seating face of the other of the first and second member.

BRIEF DESCRIPTION OF THE DRAWINGS

FIG. 3A is a top view when an elastic support body 80 is seen in a rotation axis direction X, and FIG. 3B is a sectional view of the elastic support body 80 when cut along a line III—III in FIG. 3A.

FIG. 4A is a top view when a cone disc spring 82 is seen in the rotation axis direction X, and FIG. 4B is a sectional view of the conical spring 82 when cut along a line IV—IV in FIG. 4A.

FIG. 9A is a sectional view of the reduction mechanism assembly 40 according to the invention when cut along a base face of a worm wheel 42, and FIG. 9B is a sectional view of the reduction mechanism assembly 40 when cut along a line IX—IX in FIG. 9A.

DETAILED DESCRIPTION OF PREFERRED EMBODIMENTS

Hereunder a preferred embodiment according to the invention will be described with reference to the drawings.

Figure 1:
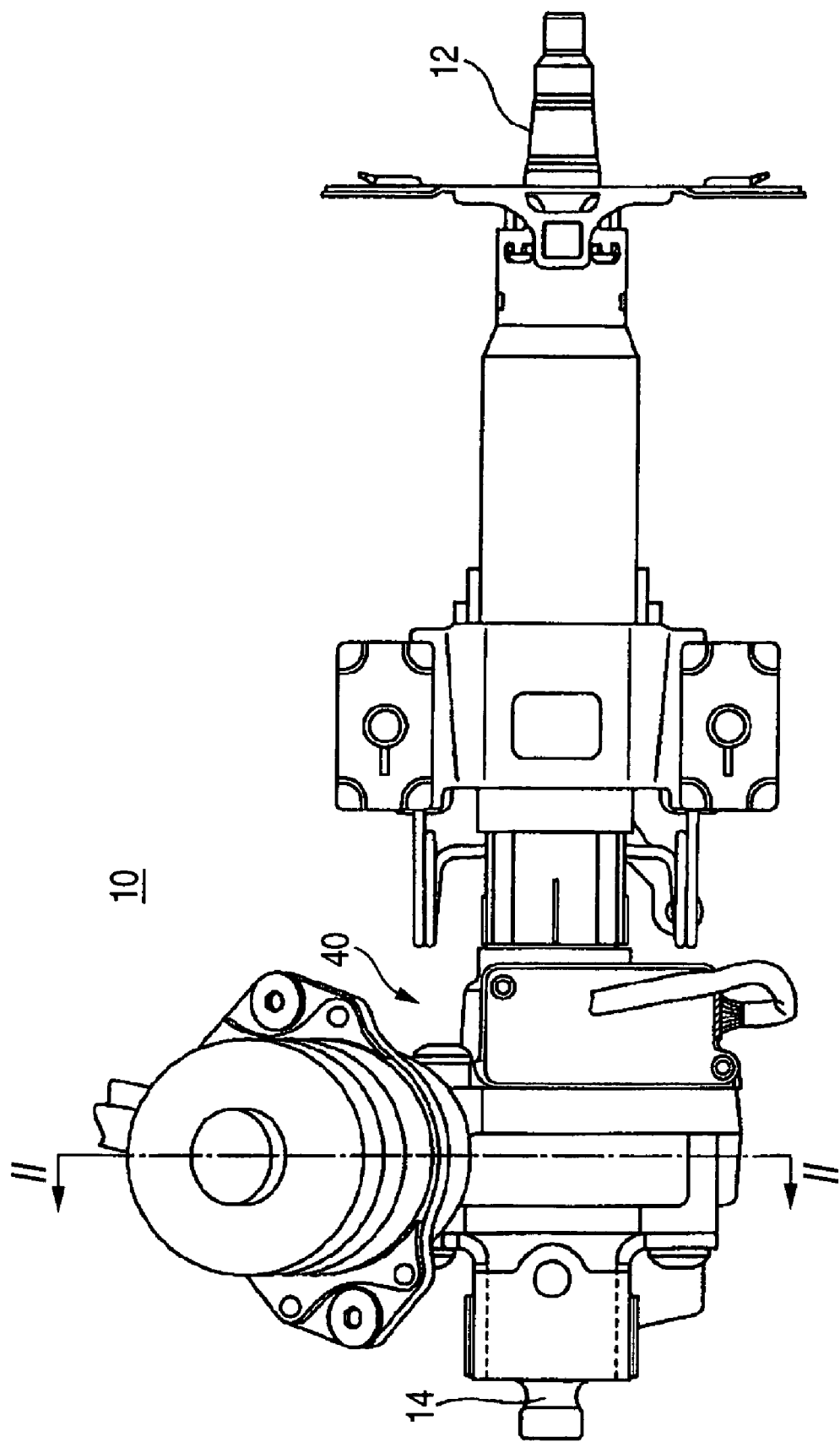
FIG. 1 is an external appearance view of an electric power steering apparatus including a reduction mechanism assembly 40 according to the invention.

FIG. 1 is an external appearance view of an electric power steering apparatus including a reduction mechanism assembly 40 according to the invention. As shown in FIG. 1, the electric power steering apparatus 10 includes an input shaft 12 at a steering wheel side. An output shaft 14 is connected to the input shaft 12 through a torsion bar (not shown in the drawing) extending within a tube. A steerage mechanism (not shown in the drawing) for steering a wheel is connected to the output shaft 14. Further, a worm wheel 42 (refer to FIG. 2) constituting the reduction mechanism assembly 40 is fixed to an outer periphery part of the output shaft 14.

Figure 2:
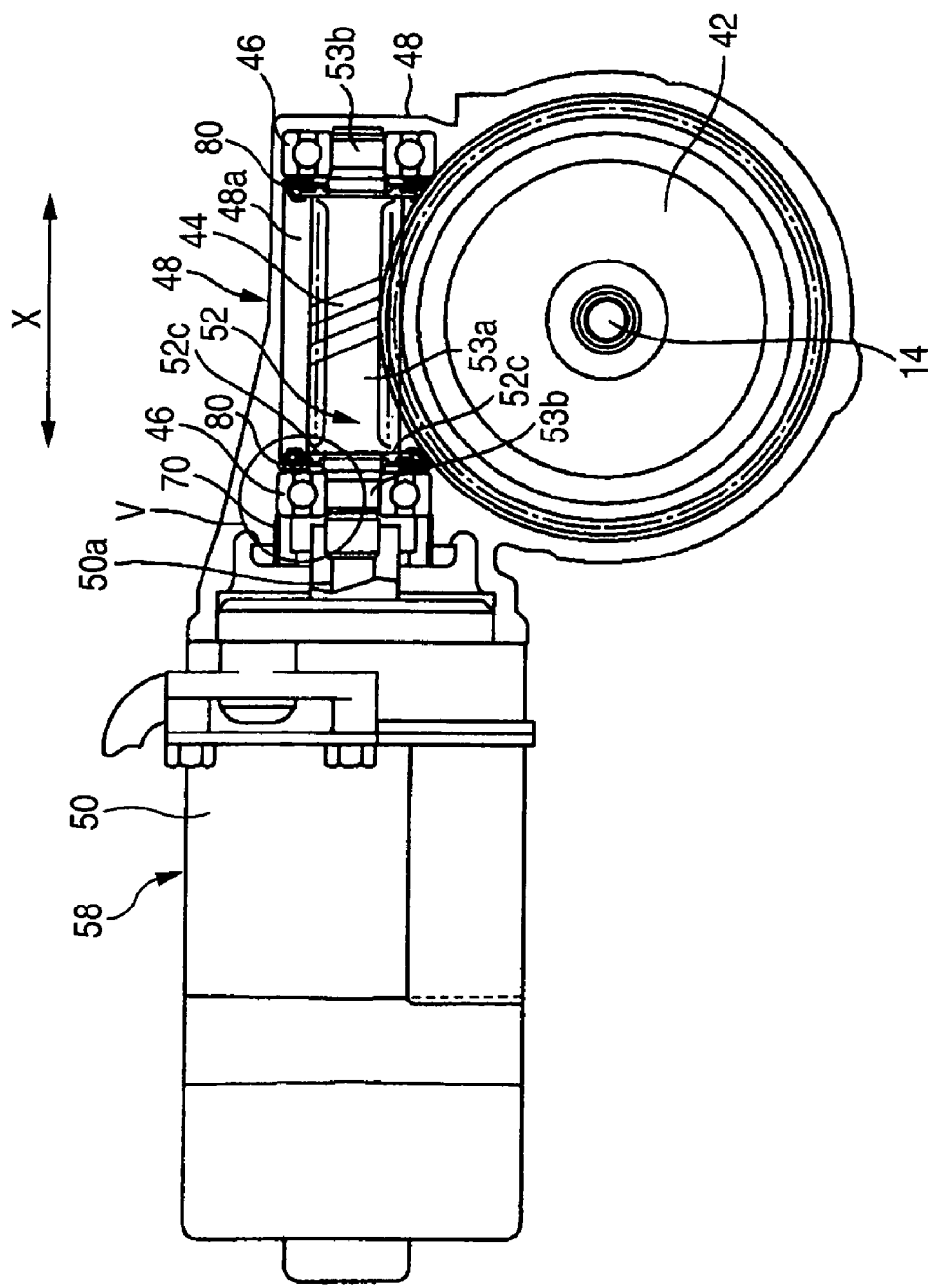
FIG. 2 is a sectional view of the reduction mechanism assembly 40 when cut along a line II—II in FIG. 1.

FIG. 2 is a sectional view of the reduction mechanism assembly 40 when cut along a line II—II (base face of the worm wheel 42) in FIG. 1. As shown in FIG. 2, the reduction mechanism assembly 40 includes a housing 48. The worm wheel 42 and a worm shaft 52 are accommodated in the housing 48. The worm shaft 52 is accommodated in an approximately cylindrical hollow part 48a of the housing 48. The worm shaft 52 has a large diameter part 53a formed with a worm 44, and small diameter parts 53b in opposite sides of the large diameter part 53a. The worm wheel 42 of the output shaft 14 is meshed with the worm 44.

A housing 58 accommodating an electric motor 50 is connected to an end part of the housing 48 of the reduction mechanism assembly 40. One end of the worm shaft 52 of the reduction mechanism assembly 40 is connected to an output shaft 50a of the electric motor 50. The worm shaft 52 and the output shaft 50a of the electric motor 50 are connected in such a mode as to mutually restrain only a rotation. Concretely, a spline (not shown in the drawing) is formed in a motor side end part of the small diameter part 53b of the worm shaft 52 along a rotation axis direction X, and a convex part slidably fitting to the spline is formed in the output shaft 50a of the electric motor 50 along the rotation axis direction X. Accordingly, the worm shaft 52 is rotated together with the output shaft 50a, but can slide with respect to the output shaft 50a of the motor 50 in the rotation axis direction X.

A predetermined ECU (Electric Control Unit) not shown in the drawing is connected to the electric motor 50. The ECU controls a rotation output of the electric motor 50 in compliance with a vehicle speed, a torsional angle of the aforesaid torsion bar, and so forth. The rotation output of the electric motor 50 is decelerated by the worm 44 on the worm shaft 52 and the worm wheel 42, and transmitted to the output shaft 14.

Two bearings 46 are respectively provided to the two small diameter parts 53b of the worm shaft 52. The bearings 46 rotatably support the worm shaft 52. In FIG. 2, a right side end part of the right side bearing 46 abuts against a bottom part of a hollow part 48a of the housing 48. In FIG. 2, a left side end part of the left side (electric motor side) bearing 46 abuts against a plug 70 (adjustment screw) detailedly explained later. By a step difference between the large diameter part 53a and the stall diameter part 53b, a flange face 52c is defined in the worm shaft 52. An elastic support body 80 detailedly explained below is respectively provided between the large diameter part 53a (flange 52c) and the bearing 46.

Next, the elastic support body 80 according to the invention will be described with reference to FIG. 3 to FIG. 8. FIG. 3A is a top view showing one embodiment of the elastic support body 80 when seen in the rotation axis direction X of the worm 44. FIG. 3B is a sectional view of the elastic support body 80 when cut along a line III—III in FIG. 3A. The elastic support body 80 of the embodiment includes a conical spring 82 (refer to FIG. 4) as an elastic body, a stopper 84 (refer to FIG. 5) and a spacer 86 (refer to FIG. 6) which sandwich the conical spring 82 from its opposite sides in the rotation axis direction X, and a cover 88 (refer to FIG. 8) which covers the stopper 84 and the conical spring 82 from a radial direction of the worm shaft 52. These four components are provided on the worm shaft 52 under a state of being assembled as the elastic support body 80.

As shown in FIG. 4(A) (a top view), the conical spring 82 has an approximately circular shape, and an insertion hole 82a, through which the small diameter part 53b of the worm shaft 52 is inserted, is formed in a center part of the conical spring 82. Incidentally, a diameter of the insertion hole 82a is set to a value larger than a diameter of the small diameter part 53a of the worm shaft 52 Notch parts 82b are formed in a peripheral edge of the insertion hole 82a. As mentioned later, a protrusion part 84b of the stopper 84 is inserted through the notch parts 82b. As shown in FIG. 4B (a sectional view when cut along a line IV—IV in FIG. 4A), the conical spring 82 is formed of a thin plate, and has a thickness in the rotation axis direction as a whole. The conical spring 82 has a structure deformable in the rotation axis direction X, and a thickness of the conical spring 82 is changed with a movement of the stopper 84 in the rotation axis direction X.

Figure 5:
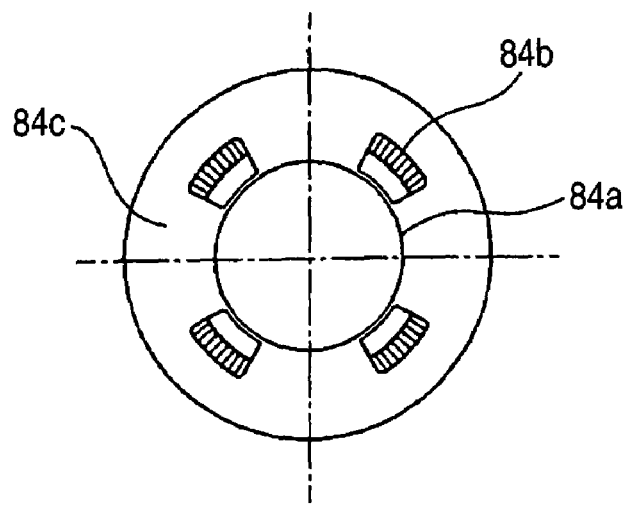
FIG. 5 is a top view when a stopper 84 is seen in the rotation axis direction X.

As shown in FIG. 5, the stopper 84 has a disc shape. An insertion hole 84a, through which the small diameter part 53b of the worm shaft 52 is inserted, is formed through a center part of the stopper 84. Incidentally, a diameter of the insertion hole 84a is set to a value smaller than the diameter of the insertion hole 82a of the conical spring 82 and slightly larger than the diameter of the small diameter part 53a of the worm shaft 52. The stopper 84 includes a base face 84c (seating face of the conical spring 82) against which the peripheral edge of the insertion hole 82a of the conical spring 82 abuts (refer to FIG. 3B). The protrusion parts 84b are formed around the insertion hole 84a of the stopper 84. The protrusion parts 84b are set correspondingly to a position of the notch part 82b of the conical spring 82.

Under an assembled state shown in FIG. 3B, the protrusion part 84b of the stopper 84 are protruded to a spacer 86 side through the notch parts 82b of the conical spring 82. Accordingly, the protrusion parts 84b of the stopper 84 have functions regulating a maximum deformation amount of the conical spring 82 in the rotation axis direction X by abutting against the base face 86c of a spacer 86, and regulating motions of the conical spring 82 in both a radial direction and a circumferential direction with respect to the stopper 84 by abutting against the notch part 82b of the conical spring 82 in both the radial direction and the circumferential direction.

Figure 6:
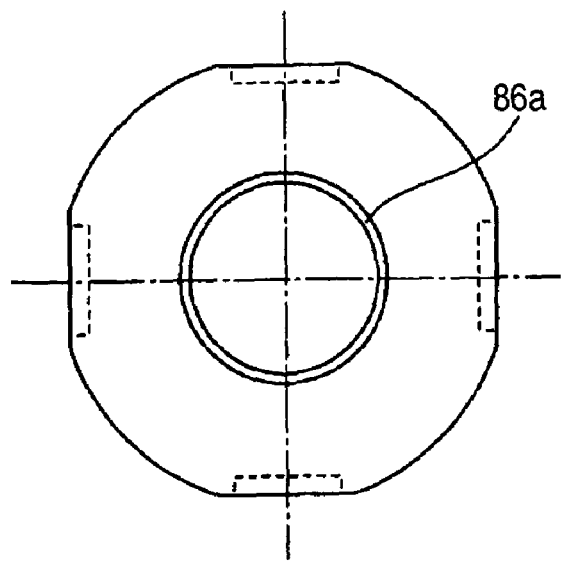
FIG. 6 is a top view when a spacer 86 is seen in the rotation axis direction X.
Figure 8:
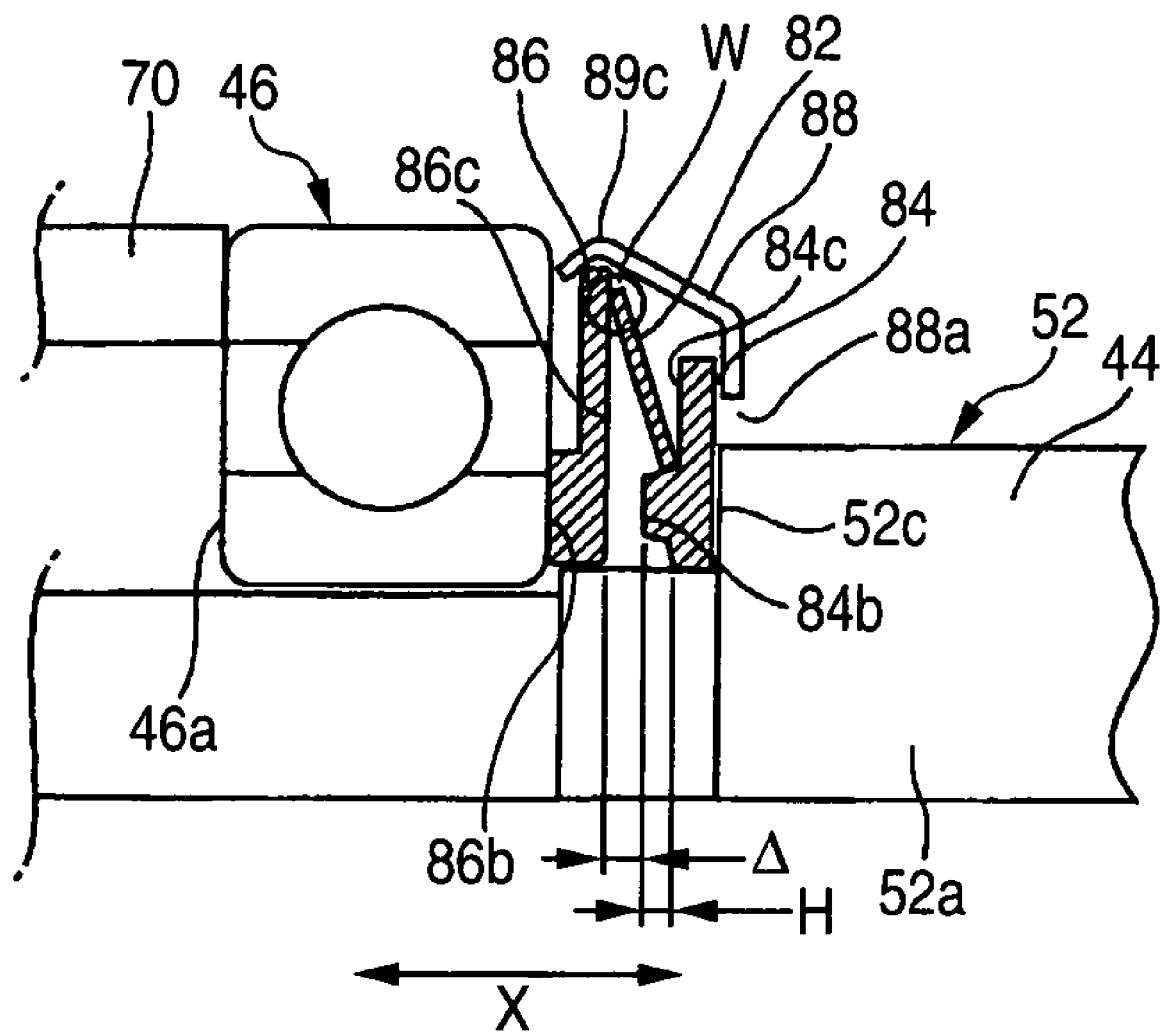
FIG. 8 is a schematic view showing the elastic support body 80 under an incorporation state.

As shown in FIG. 6, the spacer 86 has a disc shape larger than external shapes of the conical spring 82 and the stopper 84. An insertion hole 86a, through which the small diameter part 53a of the worm shaft 52 is inserted, is formed through a center part of the spacer 86. Incidentally, a diameter of the insertion hole 86a may be the same as the diameter of the insertion hole 84a of the stopper 84. The spacer 86 has a base face 86c (seating face of the conical spring 82) against which an outer periphery part of the conical spring 82 abuts (refer to FIG. 8). As shown in FIG. 8, an abutting face 86b abutting against an inner race 46a of the bearing 46 is formed in a back side (bearing 46 side) face of the spacer 86 over a whole periphery of the insertion hole 86a of the spacer 86. Accordingly, a force between the elastic support body 80 and the bearing 46 in the rotation axis direction X is transmitted through the abutting face 86b of the of the spacer 86.

Figure 7B:
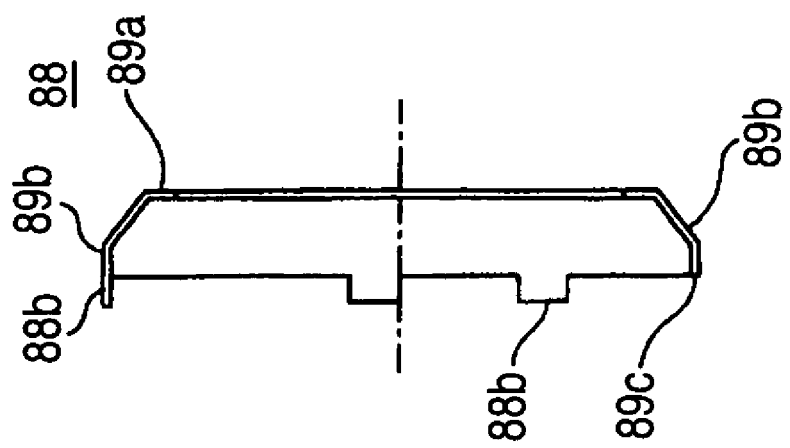
FIG. 7B is a sectional view of the cover 88 when cut along a line VII—VII in FIG. 7A.
Figure 7A:
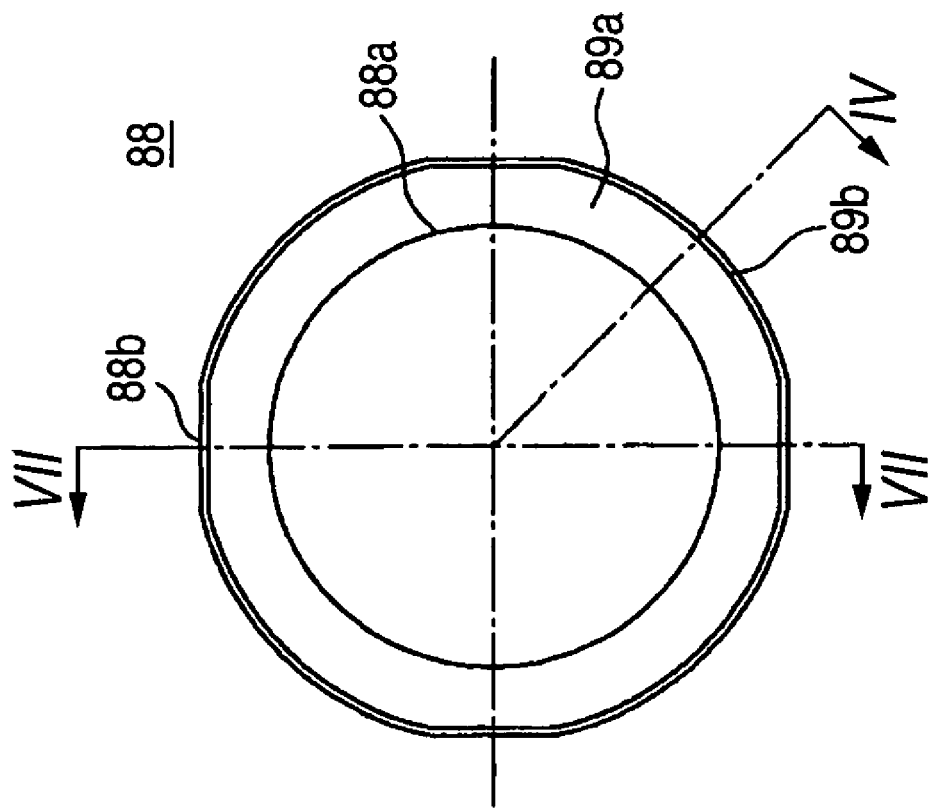
FIG. 7A is a top view when a cover 88 is seen in the rotation axis direction X.

As shown in FIG. 7A (a top view), the cover 88 has an approximately circular external shape including an upper face 89a and a cylindrical periphery wall 89b. The external shape of the cover 88 is set larger than external shapes of the conical spring 82 and the stopper 84. Further, the periphery wall 0.89b of the cover 88 has such a radial direction dimension that an outer periphery part of the conical spring 82 deformed in a maximum extent does not butt against the periphery wall 89b. An insertion hole 88a, through which the small diameter part 53a of the worm shaft 52 is inserted, is formed in a center part of the upper face 89a of the cover 88. A diameter of the insertion hole 88a is set to a value smaller than an external shape of the spacer 86 in order to prevent a separation of the spacer 86 (and the conical spring 82) from the insertion hole 88a of the cover 88. As shown in FIG. 7B (a sectional view when cut along a line VII—VII in FIG. 7A), constriction parts 88b connected to the spacer 86 are formed in a bottom edge 89c of the periphery wall 89b of the cover 88. The elastic support body 80 is assembled by setting the conical spring 82 and the stopper 84 onto the spacer 86, and then constraining the cover 88 to the spacer 86 (refer to a T part of FIG. 3A). The elastic support body 80 assembled in this manner is incorporated to the worm shaft 52 so as to be slidable in the rotation axis direction X.

FIG. 8 is a view showing the elastic support body 80 under a state of being incorporated to the worm shaft 52, and it is a schematic view in which a V part of FIG. 2 is enlarged.

Under the incorporated state of FIG. 8, the bearings 46 are interposed by the elastic support body 80 and the plug 70 (or housing 48), respectively. At this time, the conical spring 82 of the elastic support body 80 is maintained under a state of being elastically deformed between the stopper 84 and the spacer 86. That is, the stopper 84 of the elastic support body 80 is pressed to a position, in which the conical spring 82 is deformed, by the large diameter part 53a of the worm shaft 52 passing through the insertion hole 88a of the cover 88. A reaction force generated at this time is transmitted to the flange face 52c of the worm shaft 52 abutting against the stopper 84 and to the inner race 46a of the bearing 46 abutting against the abutting face 86b of the spacer 86. Accordingly, since a pressing force (pressure application) in the rotation axis direction X is exerted on the bearing 46 from the elastic support body 80, a displacement of the bearing 46 in the rotation axis direction X with respect to the plug 70 (or housing 48) is restrained.

Here, a deformation amount (initial deformation amount) of the conical spring 82 under the incorporated state of FIG. 8 is set to such a value that the pressure application can be exerted on the bearing 46 even when, as mentioned later, the worm 44 has been moved in the rotation axis direction X by a maximum limit. For this reason, as mentioned later, even in a case where the worm 44 has been moved to one side in the rotation axis direction X until the maximum limit, the deformation amount of the conical spring 82 in the other side does not become zero, so that the pressure application is yet exerted on the bearing 46. Accordingly, by setting the initial deformation amount of the conical spring 82 to an appropriate value, it becomes possible to prevent the backlash of the bearing 46 in the rotation axis direction X over a whole movable range of the worm 44.

Further, under the incorporated state of FIG. 8, an interstice Δ determining a movable amount of the stopper 84 is formed between the protrusion part 84b of the stopper 84 and the spacer 86. That is, the stopper 84 of the elastic support body 80 becomes movable, while resisting to a spring reaction force of the conical spring 82, between a position abutting against the flange face 52c of the worm shaft 52 and a position in which the protrusion part 84b of the stopper 84 abuts against the spacer 86. For this reason, the worm 44 on the worm shaft 52 becomes movable in the rotation axis direction X within a movable range determined by the movable amount of the stopper 84. Accordingly, even in a case where a force in the rotation axis direction X is exerted on the worm 44 through the worm wheel 42 owing to an input from a road surface, an assist reaction force, a reaction force of the motor 50 at a starting time and so forth, since the worm 44 in the rotation axis direction X Is moved while accompanying the deformation of the elastic support body 80 (conical spring 82), the abnormal noise generated between the tooth faces of the worm 44 and the worm wheel 42 is reduced, and the feeling of the steering wheel operation is improved.

However, in the actual worm 44, there is a case where an excessive force not capable of being absorbed by the deformation of the conical spring 82 is inputted through the worm wheel 42. In such a case, the worm 44 is moved until the maximum limit within its movable range, and thus the deformation amount of the conical spring 82 becomes maximum. Concerning this, in this embodiment, the movable range of the worm is regulated, as mentioned above, by the position in which the protrusion part 84b of the stopper 84 abuts against the spacer 86. For this reason, in this embodiment, even in a case where the excessive force is applied to the worm 44, the force applied to the worm 44 is transmitted to the housing 48 through the spacer 86 from a place where the protrusion part 84b of the stopper 84 abuts against the spacer 86, so that a load applied to the conical spring 82 is not increased. That is, in this embodiment, since a maximum deformation amount of the conical spring 82 is regulated by the fact that the protrusion part 84b of the stopper 84 abuts against the spacer 86, it is possible to prevent a deformation exceeding an allowable maximum displacement amount of the conical spring 82. In other words, according to this embodiment, by appropriately setting a protrusion amount H (height H) of the protrusion part 84b protruding from the base face 84c (seating face of the conical spring 82) of the stopper 84 toward the base face 86c (seating face of the conical spring 82) of the spacer 86, it is possible to regulate a minimum proximity distance between the base face 84c of the stopper 84 and the base face 86c of the spacer 86 and, by this, it is possible to regulate a deformable amount of the conical spring 82 within the allowable maximum displacement amount. Consequently, according to this embodiment, a durability of the conical spring 82 is improved, and a breakage of the conical spring 82 is surely prevented. Incidentally, the allowable maximum displacement amount may be determined from a viewpoint of regulating a stress amplitude generated in the conical spring 82 by the expansion/contraction within an allowable limit.

By the way, if the worm shaft 52 is moved in the rotation axis direction X, it follows that, with the expansion/contraction of the conical spring 82, the outer periphery part of the conical spring 82 slides on the base face 86c of the spacer 86. For this reason, the wear particles are generated in a slide part W between the conical spring 82 and the spacer 86. There is a fear that such wear particles enter into meshing parts, of the worm 44 and the worm wheel 42 located near the slide part W between the conical spring 82 and the spacer 86. Accordingly, in order to enhance the durability of the worm 44 and the worm wheel 42, it is necessary to prevent the foreign matters including the wear particles from entering into the meshing parts of the worm 44 and the worm wheel 42.

In this embodiment, as shown in FIG. 3B and FIG. 8, the bottom edge 89c of the cover 88 of the elastic support body 80 abuts against a surface of the spacer 86 along the outer periphery part of the spacer 86. For this reason, substantially no clearance in the rotation axis direction X is formed between the periphery wall 89b of the cover 88 and the spacer 86, so that an internal space of the elastic support body 80 is closed in a radial direction by the periphery wall 89b of the cover 88. Consequently, according to the embodiment, it is possible to prevent the foreign matters including the wear particles generated in the internal space of the elastic support body 80 from entering into the meshing parts of the worm 44 and the worm wheel 42. As a result, according to this embodiment, a reliability and a durability of the meshing parts of the worm 44 and the worm wheel 42 are improved. Further, in this embodiment, by providing the cover 88, no foreign matters enter into the internal space of the elastic support body 80 from an outside, and also an expansion/contraction operation of the conical spring 82 is not hindered by the entry of the foreign matters.

Further, since the elastic support body 80 of this embodiment is assembled by connecting the cover 88 to the spacer 86 on which the conical spring 82 and the stopper 84 have been mounted, a productivity is good, further, since it is mounted to the worm shaft 52 under-the assembled state, a wokability and an incorporating ability are good, and an erroneous incorporation (for example, an error in an attaching direction of the conical spring 82 with respect to the worm shaft 52) does not occur as well.

Figure 10:
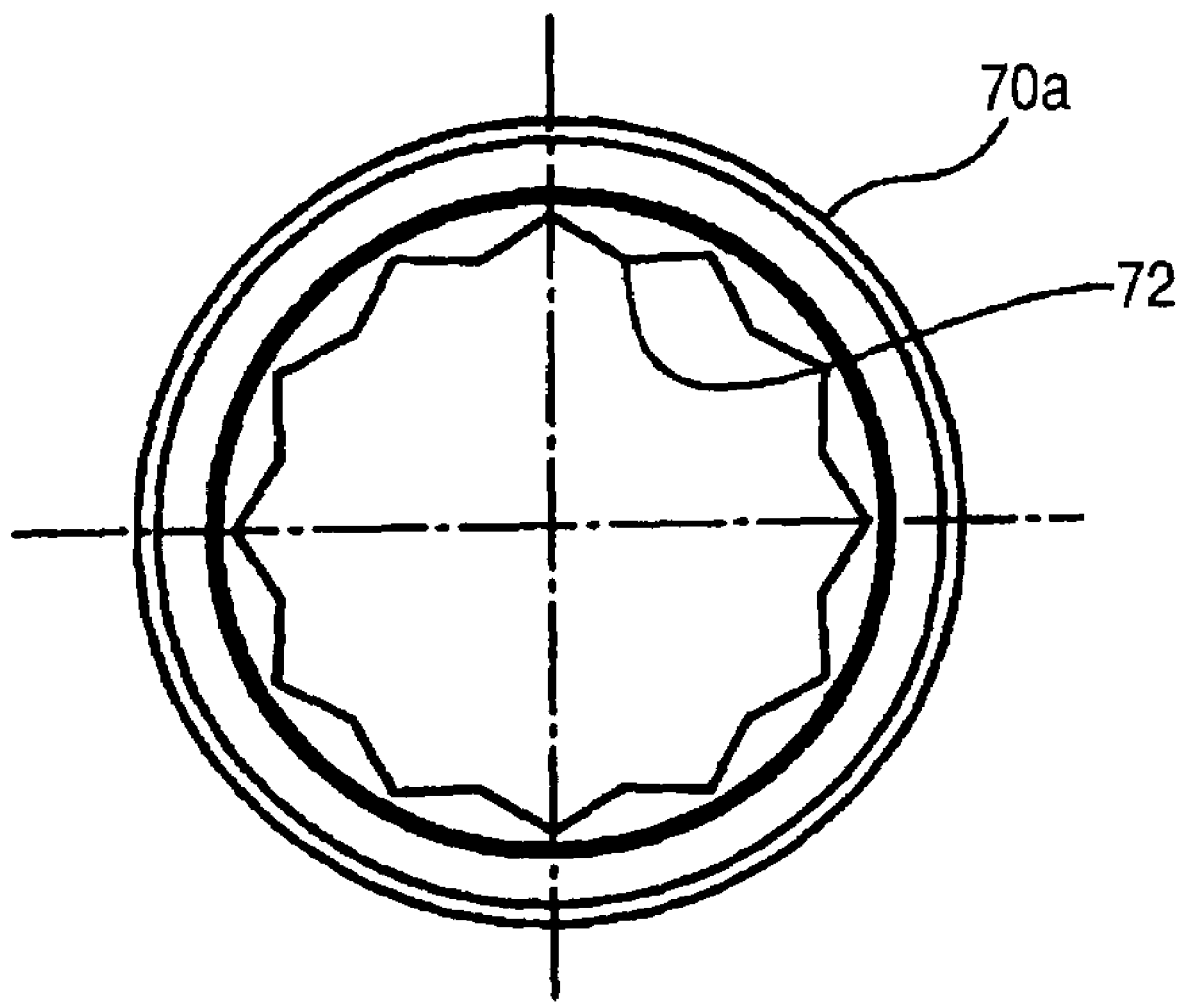
FIG. 10 is a top view when a plug 70 is seen in the rotation axis direction X.

Next, an adjustment method of the movable amount of the worm 44 according to the invention will be described with reference to FIG. 9A to FIG. 12. FIG. 9A is a sectional view showing an assembled state of the reduction mechanism assembly 40 according to the invention when cut along a base face of the worm wheel 42, and FIG. 9B is a sectional view showing the assembled state of the reduction mechanism assembly 40 when cut along a line IX—IX in FIG. 9A. FIG. 10 is a top view when the plug 70 is seen in the rotation axis direction X. In this embodiment, the movable amount of the worm 44 is adjusted by the plug 70 abutting against the bearing 46 as explained below.

As shown in FIGS. 9A, 9B and 10, the plug 70 has a cylindrical shape, and includes an end face 70b constituting a face abutting against an outer race 46b of the bearing 46. In an outer periphery face 70a of the plug 70, there is formed a thread ridge meshing with a thread groove formed in the hollow part 48a of the housing 48. Further, a concave/convex face 72 is formed in an inner periphery face of the plug 70. A position of the plug 70 in the rotation axis direction X is adjusted by rotating an adjustment tool (not shown in the drawing) engaged with the concave/convex face 72 of the plug 70. Accordingly, the position of the plug 70 in the rotation axis direction X is adjusted to adjust a position of the bearing 46 in the rotation axis direction X, and to adjust the movable amount of the worm 44 in the rotation axis direction X with the former adjustment.

Here, the movable amount of the worm 44 in the rotation axis direction X is univocally determined by the movable amount of the stopper 84 of the elastic support body 80 in the rotation axis direction X when, as mentioned above, the position of the plug 70 in the rotation axis direction X has been definitely determined (and, with this, when a position of the bearing 46 in the rotation axis direction X has been definitely determined). That is, the movable amount (in one side) of the worm 44 is determined by the interstice A formed between the protrusion part 84b of the stopper 84 and the spacer 86 when the position of the plug 70 has been definitely determined. Further, the above-mentioned initial deformation amount (pressure application) of the conical spring 82 is determined in dependence on a thickness of the conical spring 82 in the rotation axis direction X at a non-deformed time, and a distance of the base face 84c of the stopper 84 in the rotation axis direction X with respect to the base face 86c of the spacer 86 when the position of the plug 70 in the rotation axis direction X has been definitely determined.

However, even in a case where the plug 70 is set to an appropriate position on the basis of a design value, since the movable range of the worm 44 (movable range of the stopper 84) and a magnitude of the pressure application exerted on the bearing 46 after an actual incorporation depend on various factors such as dimensional accuracies of the bearing 46, the elastic support body 80 and the large diameter part 53a of the worm shaft 52 in the rotation axis direction X and load-deflection characteristics of the conical spring 82, there may be a case where they deviate from predetermined appropriate values owing to an accumulation of dimension errors of these components, an incorporation error, a dispersion of the load-deflection characteristics, and so forth. In such a case, there arise a disadvantage that the feeling of the steering wheel operation is deteriorated, and a disadvantage that an appropriate pressure application is not exerted on the bearing 46 and thus the backlash in the rotation axis direction X occurs in the bearing 46 when the worm 44 is moved. Further, for example, under a state of the electric power steering apparatus of FIG. 1, it is structurally difficult to detect an actual movable amount of the worm 44.

As described below, in this embodiment, it is made possible to detect the actual movable amount of the worm 44, and it is made possible to adjust the movable amount of the worm within an appropriate range.

Figure 11:
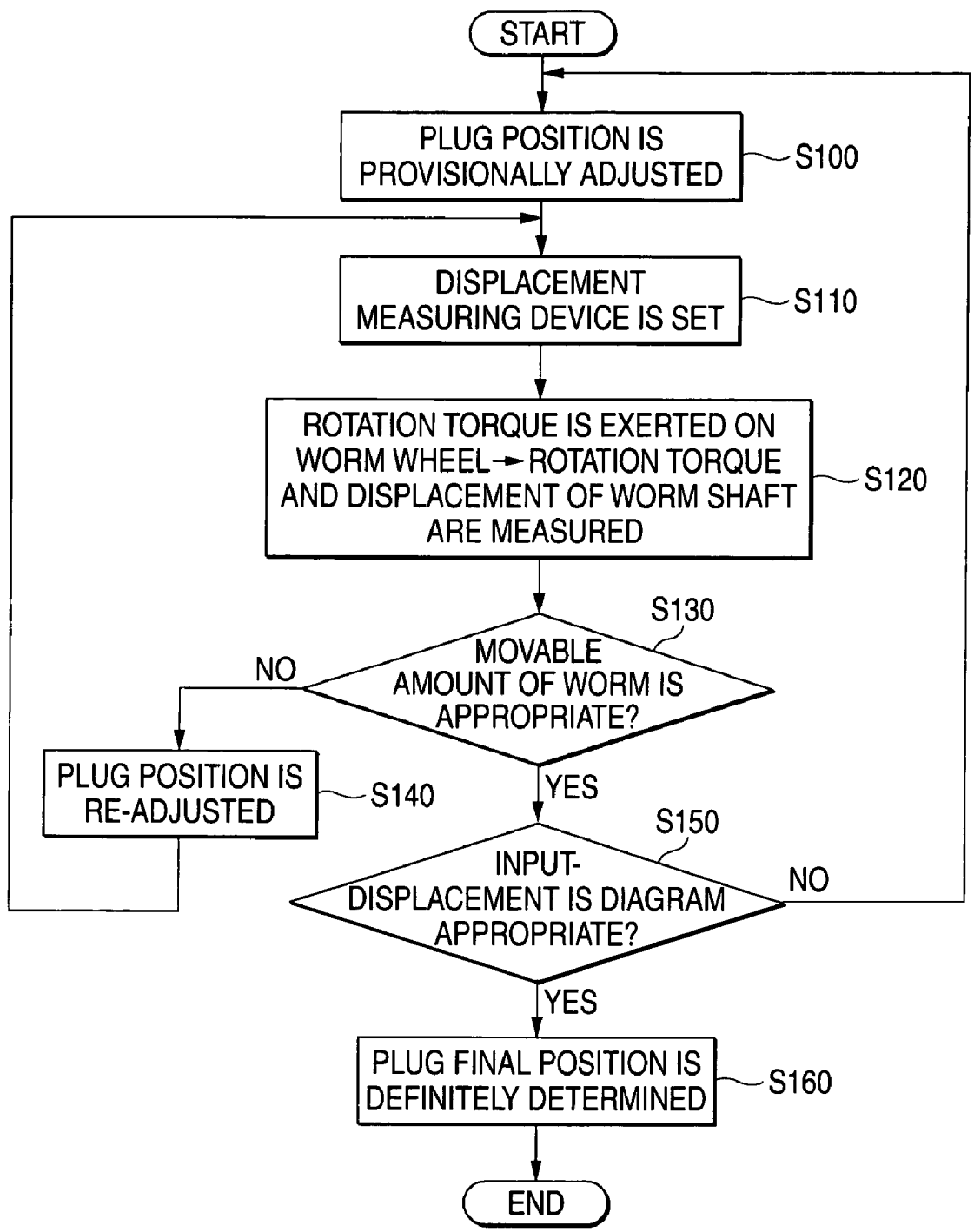
FIG. 11 is a flowchart showing an adjustment method of a movable amount of a worm 44 according to the invention.

FIG. 11 is a flowchart showing an adjustment method of the movable amount of the worm 44 according to the invention. The adjustment of the movable amount of the worm 44 according to the invention is performed before the housing 58 of the electric motor 50 is connected to the housing 48 of the reduction mechanism assembly 40, and before the output shaft 14 formed with the worm wheel 42 is connected to the steerage mechanism. First, in a step S100, a position of the plug 70 in the rotation axis direction X is provisionally adjusted. The position of the plug at this time may be an approximate position on the basis of the design value.

In a subsequent step S110, a displacement measuring device 92 for detecting the movable amount of the worm 44, is set to an open side (side to which the housing 58 of the electric motor 50 is attached) of the hollow part 48a of the housing 48. As schematically shown in FIG. 9A, the displacement measuring device 92 includes a pin 92a supported by a spring 92b or the like so as to be movable in the rotation axis direction X, and may be one detecting the movable amount of the worm 44 by measuring a displacement (stroke amount) of the pin 92a. At this time, a tip part of the pin 92a of the displacement measuring device 92 is set so as to abut against an end face of the worm shaft 52 while passing through an inside of the cylindrical plug 70. At this time, the worm shaft 52 is restrained in its rotation, and made a state in which only a displacement in the rotation axis direction X is allowed. This state of the worm shaft 52 may be realized by the displacement measuring device 92. In this case, the displacement measuring device 92 includes a hollow shaft part 93 fitted to the worm shaft 52 and, a convex part fitted to the spline of the worm shaft 52 is formed in an inner face of the hollow shaft part 93 so as to be slidable in the rotation axis direction X. Incidentally, in this case, there may be adopted a structure in which the pin 92a is inserted through a hollow inside of the hollow shaft part 93.

In a subsequent step S120, a treatment for applying a rotation torque to the worm wheel 42 meshing with the worm 44 is performed. As schematically shown in FIG. 9B, in this embodiment, an input device 94 including an actuator rotating the output shaft 14 formed with the worm wheel 42 is used. However, the input device 94 may be one directly rotating the worm wheel 42. In this step, the worm 44 is moved from an initial position (for example, balanced position of both the elastic support bodies 80) to one side until a maximum limit by the input device 94, then moved to the other side until a maximum limit, and finally moved to the initial position. Incidentally, a detection of a place where the worm 44 has been moved until the maximum limit, that is, a place where the protrusion part 84b of the stopper 84 abuts against the spacer 86, maybe replaced with such a detection that detects whether or not the following state continues for several seconds; the states being that a rotor of the actuator is not rotated when a duty became more than a certain predetermined number or an electric current became higher than a certain predetermined value. During this step, a value (hysteresis) of the rotation torque exerted on the output shaft 14 is outputted by the input device 94, and a value (hysteresis) of a displacement (displacement with the initial position being made a reference) of the worm shaft 52 is outputted by the displacement measuring device 92.

Figure 12:
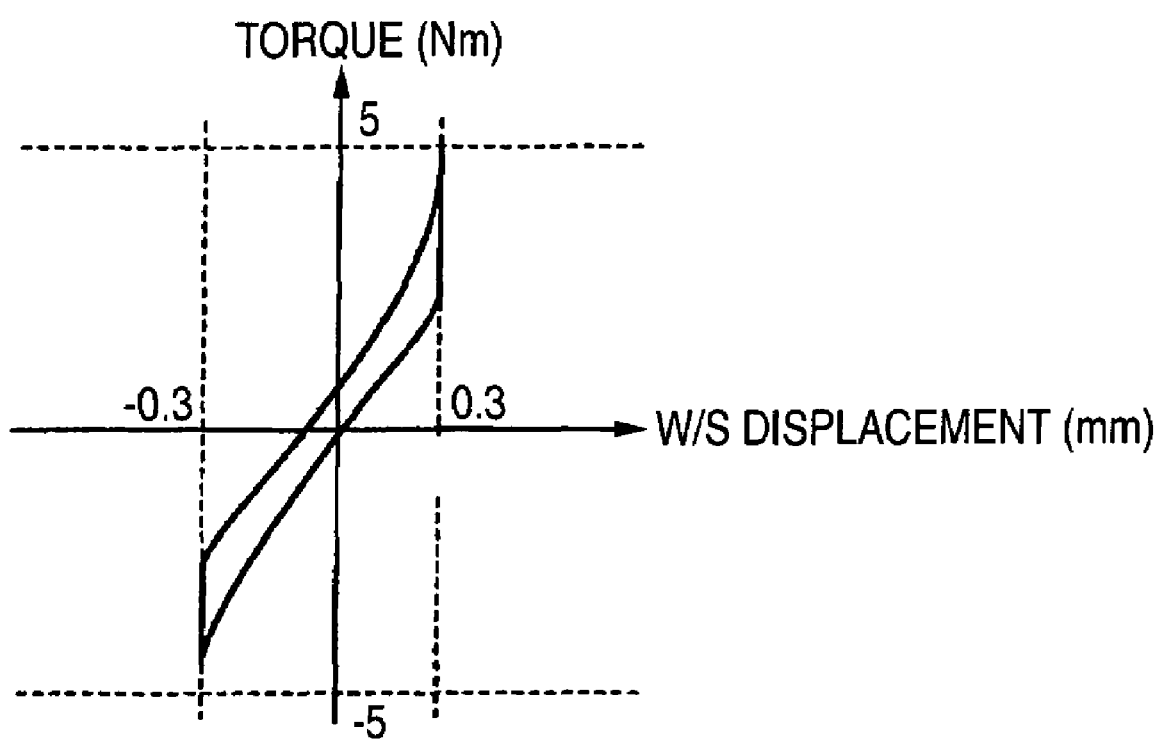
FIG. 12 is a view showing one example of an input-displacement diagram obtained in an adjustment process of the movable amount of the worm 44 according to the invention.

In a subsequent step S130, on the basis of the value of the displacement measured by the displacement measuring device 92, a treatment is performed to judge whether or not the movable amount of the worm 44 is within an appropriate range. In this step, preferably, on the basis of the hysteresis of the rotation torque exerted on the output shaft 14 and the hysteresis of the displacement of the worm shaft 52, such an input-displacement diagram as shown in FIG. 12 is formed. As shown in FIG. 12, the movable amount (total movable amount) of the worm 44 is found as a difference between a maximum value and a minimum value of the displacement of the worm shaft 52. In this step, in a case where it is judged that the movable amount of the worm 44 is within an appropriate range (for example, 0.6±0.04 mm), it proceeds to a step S150 and, in a case other than it, proceeds to a step S140 in order to perform a re-adjustment of the position of the plug 70.

In the step S140, the position of the plug 70 is re-adjusted in compliance with a deviation amount and a deviation angle from the appropriate range of the movable amount of the worm 44. For example, in a case where the movable amount of the worm 44 deviates in a plus direction from the appropriate range, the plug 70 is additionally screw-advanced into the housing 48 by an amount corresponding to the deviation amount by using the above-mentioned adjustment tool. After the step S140 is finished, it is returned to the above step S120 and, in the subsequent step S130, the movable amount of the worm 44 after the readjustment is re-evaluated. Incidentally, a function of the above-mentioned adjustment tool (i.e., function changing the position of the plug 70) may be realized by the displacement measuring device 92. In this case a concave/convex face corresponding to the concave/convex face 72 in the inner periphery face of the plug 70 is formed in an outer periphery face of the hollow shaft part 93 of the displacement measuring device 92. The readjustment of the position of the plug 70 is realized by rotating the hollow shaft part 93. Incidentally, after the position of the plug 70 has been re-adjusted, the rotation of the hollow shaft part 93 of the displacement measuring device 92 is restrained in order to restrain the rotation of the worm shaft 52 during the subsequent step S120. By this, it becomes possible to simplify a working process concerning the readjustment of the position of the plug 70, and shorten a working time.

In the step S150, on the basis of such an input-displacement diagram as shown in FIG. 12, it is finally judged whether or not desired movable characteristics of the worm 44 are realized over a whole of the appropriate movable range of the worm 44. For example, on the basis of the input-displacement diagram shown in FIG. 12, by evaluating a magnitude of the rotation torque with respect to the displacement of the worm 44 and a difference in the rotation torque owing to a difference in a moving direction of the worm 44, it is possible to judge whether or not an appropriate pressure application is exerted on the bearing 46. (whether or not the initial deformation amount of the conical spring 82 of the elastic support body 80 is appropriate), and judge whether or not sliding resistances of the elastic support body 80 and between the bearing 46 and the worm shaft 52 are appropriate (whether or not an appropriate incorporation state is ensured). In the step S50, in a case where it has been judged, on the basis of the input-displacement characteristics, that the desired movable characteristics of the worm 44 are realized, it proceeds to a step S160, the plug 70 is held in a final adjustment position by a lock nut 74 (refer to FIG. 9(A)), and the adjustment of the movable amount of the worm 44 (assemblage of the reduction mechanism assembly 40) is completed. On the other hand, in a case where it has been judged that desired movable characteristics of the worm 44 are not realized, after a re-incorporation, an exchange of the component and so forth have been performed, the treatments from the step S100 are repeated again in order to obtain a desired input-displacement diagram. Incidentally, this input-displacement diagram can be used also in an evaluation, an adjustment and so forth of load-deflection characteristics of the conical spring 82 in a design initial stage.

As mentioned above, according to the invention, it becomes possible to detect an actual movable amount of the worm 44 (movable amount of the worm 44 under an assembled state of the reduction mechanism assembly 40 of FIGS. 9A and 9B), and it becomes possible to adjust the actual movable amount of the worm 44. As a result, it becomes possible to strictly control, for example, the actual movable amount of the worm 44 within an allowable error of the order of 0.01 (e.g., 0.6±0.04 mm) mm with respect to a nominal value (e.g., 0.6 mm). Consequently, according to this embodiment, it becomes possible to always realize an appropriate movable amount of the worm 44 and an exertion of the appropriate pressure application on the bearing 46 without being subjected to influences of the dimension errors of the bearing 46, the elastic support body 80 and so forth, the incorporation error, the deviation in the load-deflection characteristics of the conical spring 82, and so forth. Further, according to this embodiment, on the basis of the input-displacement diagram, it is possible to evaluate actual movable characteristics of the worm 44 and the incorporation state, so that it is possible to extremely improve a reliability of the reduction mechanism assembly 40.

In the above, it has been detailedly explained about the preferred embodiment of the invention, but the invention is not limited to the above-mentioned embodiment, and various modifications and replacements can be added to the above-mentioned embodiment unless deviating from a scope of the invention.

For example, in the above-mentioned embodiment, it is possible to cause the spacer 86 of the elastic support body 80 to have the function of the stopper 84. In this case, a protrusion part abutting against the base face 84c of the stopper 84 is formed in the base face 86c of the spacer 86 and, similarly to the above-mentioned embodiment, it becomes possible to regulate the maximum deformation amount of the conical spring 82 in the rotation axis direction X. Further, the similar protrusion parts may be formed in both of the spacer 86 and the stopper 84. Further, in the above-mentioned embodiment, it is also possible to use other elastic body, such as O-ring, rubber and coil spring for instance, in place of the conical spring 82 of the elastic support body 80.

Further, in the above-mentioned embodiment, the displacement of the worm shaft 52 has been measured in order to detect the movable amount of the worm 44, but a constitution is also possible in which a rotation amount of the worm wheel 42 is measured and, on the basis of the rotation amount, the movable amount of the worm 44 is inferred. In this case, in place of the input-deformation diagram of FIG. 12, an input-rotation amount diagram may be used in the final judgement in the step S150.

Further, in the above-mentioned embodiment, the displacement of the worm shaft 52 has been measured from the open side of the hollow part 48a of the housing 48 by penetrating the pin 92a through the cylindrical plug 70, but such a structure is also applicable that the displacement of the worm shaft 52 is measured by forming an orifice in a bottom part of the hollow part 48a of the housing 48 and inserting the pin 92a into the orifice.

Further, in the above-mentioned embodiment, the displacement amount of the worm shaft 52 (movable amount of the worm 44) has been mechanically measured on the basis of the displacement amount of the pin 92a, but it is also possible to use other mechanical measuring method and an optical measuring method. Further, the measurement of the displacement of the worm shaft 52 can be realized also by a displacement measuring device which chucks an end part of the worm shaft 52 (which restrains the rotation and the displacement in the rotation axis direction X) and can push/pull the worm shaft in the rotation axis direction X. In this case, by measuring the displacement amount of the worm shaft 52 and a load in the rotation axis direction X exerted on the worm shaft 52, it is also possible to obtain the input-displacement diagram as shown in FIG. 12.

The invention explained above provides such an advantage as described below. According to the invention, it is possible to assure the appropriate movable amount of the worm shaft (or worm) in the structure supporting the worm shaft through the elastic body.

What is claimed is:

1. An elastic support assembly for an electric power steering apparatus in which a worm shaft is supported movably in a rotation axis direction through the elastic support assembly, the elastic support assembly comprising:
    a pair of first and second members relatively movable in the rotation axis direction according to a movement of the worm shaft;
    an elastic body provided between the first and second members in the rotation axis direction; and
    a cover which covers an outer periphery part of the elastic body from a radial direction of the worm shaft and is connected to the first member.

2. The elastic support assembly according to claim 1, wherein
    the first and second members include seating faces on which the elastic body seats, respectively, and
    the seating face of at least one of the first and second members is formed with a protrusion part protruding toward the seating face of the other of the first and second members.

3. The elastic support assembly according to claim 1, wherein the first and second members have a substantially disc shape and respectively include insertion holes through which the worm shaft is inserted, the elastic body includes an insertion hole through which the worm shaft is inserted, the second member and the elastic body are interposed between the first member and the cover, the cover includes an upper face having an insertion hole through which the worm shaft is inserted, and a cylindrical periphery wall extending from an outer periphery part of the upper face to an outer periphery part of the first member, and the periphery wall is connected to the first member, and the elastic body and the second member are accommodated in a space defined by the first member, the upper face of the cover and the periphery wall of the cover so as to prevent the elastic body and the second member from separating therefrom.

4. The elastic support assembly according to claim 3, wherein the first and second members include respectively seating faces on which the elastic body seats and, the seating face of at least one member of the first and second members comprises a protrusion part protruding toward the seating face of the other of the first and second member.

5. The elastic support assembly according to claim 1, wherein the elastic body includes an insertion hole through which the worm shaft is inserted.

6. The elastic support assembly according to claim 1, wherein the second member and the elastic body are interposed between the first member and the cover.

7. The elastic support assembly according to claim 1, wherein the cover includes an upper face having an insertion hole through which the worm shaft is inserted, and a cylindrical periphery wall extending from an outer periphery part of the upper face to an outer periphery part of the first member.

8. The elastic support assembly according to claim 7, wherein the periphery wall is connected to the first member, and the elastic body and the second member are accommodated in a space defined by the first member, the upper face of the cover and the periphery wall of the cover such that the elastic body and the second member are inhibited from separating therefrom.

9. The elastic support assembly according to claim 1, wherein the elastic support assembly is slidable in the rotation axis direction according to a movement of the worm shaft.

10. The elastic support assembly according to claim 1, wherein the elastic body comprises a conical spring having an outer and an inner diameter.

11. The elastic support assembly according to claim 10, wherein the conical spring further includes a notch on a portion of the inner diameter.

12. The elastic support assembly according to claim 10, wherein the inner diameter is less than a diameter of the worm shaft to which the elastic body is attached.

13. The elastic support assembly according to claim 10, wherein the conical spring is deformable along the rotation axis direction according to a movement of the worm shaft.

14. The elastic support assembly according to claim 2, wherein the protrusion part protrudes through a notch on a portion of an inner diameter of the elastic body to regulate the maximum amount of deflection of the elastic body along the rotational axis of direction according to a movement of the worm shaft.

15. The elastic support assembly according to claim 1, wherein the first and second members include an insertion hole for receiving the worm shaft, wherein the first and second member insertion holes have a diameter which is less than a diameter of the worm shaft, and wherein the cover contacts and holds outer periphery portions of the first and the second members.

16. The elastic support assembly according to claim 15, wherein the first and second member insertion holes have the same diameter.

17. The elastic support assembly according to claim 1, wherein the elastic support assembly urges the worm toward the worm gear in the axial direction.

18. The elastic support assembly according to claim 1, wherein the elastic support assembly adjusts a movable amount of the worm in the axial direction.

19. An elastic support assembly for an electric power steering apparatus in which a worm shaft is supported movably in a rotation axis direction through the elastic support assembly, the elastic support assembly comprising:

a pair of first and second members relatively movable in the rotation axis direction according to a movement of the worm shaft;

an elastic body provided between the first and second members in the rotation axis direction; and a cover which covers an outer periphery part of the elastic body from a radial direction of the worm shaft and is connected to the first member, wherein the pair of first and second members are spaced a distance from each other along the rotation axis direction according to a movement of the worm shaft.

20. The elastic support assembly according to claim 19, wherein the elastic body is mounted between the distance between the first and second members spaced along the rotation axis direction according to a movement of the worm shaft.

* * * * *